Oct. 1, 1935.   F. J. MAW   2,015,949
SLIDE FOR TESTING LIQUIDS
Filed July 28, 1934

Inventor
Frank James Maw.
By John J. Thompson
Attorney

Patented Oct. 1, 1935

2,015,949

UNITED STATES PATENT OFFICE 2,015,949

SLIDE FOR TESTING LIQUIDS

Frank James Maw, Ingleside, Port Nelson, Ontario, Canada

Application July 28, 1934, Serial No. 737,362

9 Claims. (Cl. 88—14)

This invention relates to a liquid testing slide of that class which is intended for holding a sample of liquid for the purpose of testing the same, and the invention relates more particularly to a slide for holding a sample of lubricating oil in connection with the oil testers shown and described in United States patents, Numbers 1,940,373 issued on December 19, 1933; and 1,940,772 issued on December 26, 1933, to V. A. Schoenberg.

In the testing of oil or other liquids, a small quantity, and in many cases only a drop of the liquid is placed between two transparent pieces of glass or other suitable material, the excess liquid removed therefrom and the slide thus formed placed in a testing device having a strong light which is passed through the thin film of liquid retained between the transparent glasses where the condition of the liquid may be determined.

In the design of a suitable slide for this purpose, means must be provided for receiving a small quantity of the liquid, easily and quickly reducing the sample to a predetermined thickness or film and removing the excess liquid.

While the slide herewith described and claimed is primarily intended for use with oil testing devices, it may be used for holding any liquid and either for testing under a microscope, or the transparent windows may be of a magnifying medium, or their surfaces may be divided by hair lines into small squares, and it is understood that the slide may be used in either a vertical or horizontal position.

The object of the invention is to provide a liquid testing slide of this kind that shall be compact, simple, contain few parts, be easily cleaned and durable in construction.

Another object of the invention is to provide a testing slide having means operated by the closing of the slide, for trapping a predetermined quantity and thickness of the liquid between the transparent lens.

Another object of the invention is to provide such a simple slide that the operation is reduced to, first the introduction of the liquid, and second and last the closing of the slide which completes the operation.

With these and other objects in view, my invention consists in certain construction and combination of parts as will hereinafter be fully described and claimed, and further illustrated in the accompanying drawing which forms a part hereof and in which like figures of reference refer to corresponding parts in all of the views, and it is understood that slight changes may be made without departing from the spirit of the invention.

Figure 1:
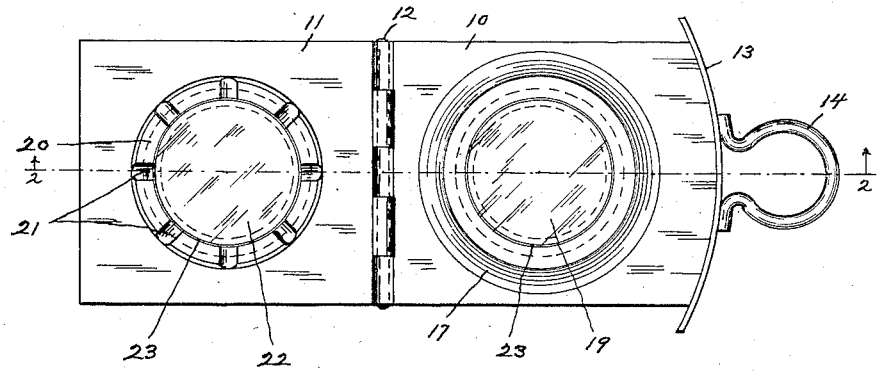
Figure 1 shows the slide in an open position ready for loading.

Referring to the drawing:

As the device is herewith shown, it comprises the two hinged plates 10 and 11, made from some suitable material such as metal and shown as hinged together as at 12, but which may be detached from each other if so desired; the plate 11 being slightly shorter than the plate 10, which is provided with the curved end plate 13 and the handle 14, but both the size and the shape of these plates may vary on account of the uses for which they are intended, and the design of testing machine with which they are intended to be used.

Figure 3:
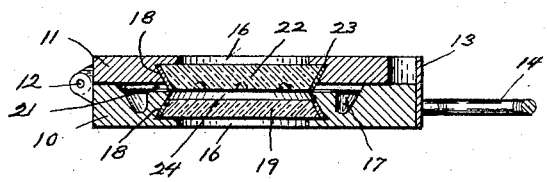
Figure 3 is a similar sectional view, but with the slide closed.

These plates 10 and 11 are both formed with a central opening or orifice 16, which will register with each other when the plates 10 and 11 are superimposed one upon the other in a closed position as shown is Figure 3; and each of these orifices or openings 16 are formed with an undercut annular groove 18 of slightly larger diameter that the diameter of the opening or orifice 16.

Figure 2:
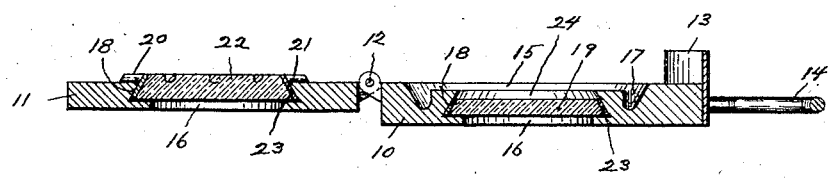
Figure 2 is a sectional view taken on the line 2—2 of Figure 1.

As shown in Figures 1, 2 and 3, the plate 10 is slightly thicker than the plate 11, and above the opening or orifice 16 is formed a depression or pocket 15 which communicates with an annular groove 17 which is formed concentric with, and of a larger diameter than that of the opening or orifice 16, and which provides a container for the excess liquid which is forced out by the closing of the two plates.

The plate 11 as shown in Figures 1, 2 and 3, is formed with a ring 20 which is slightly raised above the surface of the plate 11 and is concentric with the opening or orifice 16, and this ring 20 is formed with a series of radial ducts 21, which communicate with the annular groove 17 when the plates are closed one upon the other.

Within the annular grooves 18 are secured the lenses 19 and 22, by the cement or other suitable material 23; and these lenses may be of any suitable material such as glass either plain or magnifying, or any transparent material which may be used for this purpose; the lens 19 in the plate 10 being set slightly below the surface of the plate to form the liquid chamber 24, while the lens 22 is set flush with the surface of the ring 20 in such a manner as to co-act with the lens 19 when the plates 10 and 11 are in a closed position to form the liquid chamber 24 between said lenses 19 and 22, as shown in Figure 3.

Figure 4:
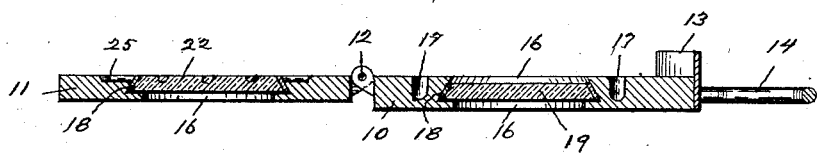
Figure 4 is a sectional view showing a modified form of the device.

In the modified construction shown in Figure 4, the plate 11 has in place of the annular ring 20, the ducts 25 formed directly in the face of the plate 11; the lens 19 being positioned in plate 10 in the same manner as shown in Figures 2 and 3, while that of the lens 22 located in the plate 11 is set flush with the surface of the plate as this plate 11 has no raised annular ring.

In the operation of the device, a small quantity of the liquid to be tested, such as oil, is placed upon the surface of the lens 19; the plates 10 and 11 are then closed one upon the other, and the liquid will be trapped in the liquid chamber formed between the adjacent surfaces of the lenses 19 and 22, which are spaced apart a predetermined distance to retain the required thickness or film of the liquid, and the excess liquid will by the closing action be forced through the ducts 21 into the annular groove 17, or in place of this annular groove 17 the plate may be formed with a series of holes through which the liquid may pass.

After the test, the slide may be cleaned in any suitable manner, and is again ready for use.

Having thus described my invention, what I claim as new and desire to secure by Letters Patent, is:

1. In a liquid testing container or slide, the combination with two plates adapted to be superimposed one upon the other and each formed with an opening therein, lenses mounted in said openings a predetermined distance from the adjacent faces of the plates to form a chamber for the liquid of a predetermined capacity, a recess formed adjacent to said liquid chamber and communicating therewith, restricted radial passages between said liquid chamber and said recess for removing the excess liquid from the liquid chamber and maintaining a predetermined quantity of the liquid within the chamber.

2. In a liquid testing container or slide, the combination with a pair of plates adapted to be superimposed one upon the other and each formed with an opening therein, lenses mounted in said openings a predetermined distance from the faces of the plates to form a liquid chamber of predetermined capacity, a recess formed between said plates and communicating with said liquid chamber, restricted radial passages between said liquid chamber and the recess for the removal of the excess liquid from the liquid chamber after the same has been filled to capacity.

3. In a slide for testing liquids, the combination with a pair of flat plates hinged together and adapted to close one upon the other and each formed with an opening in registry with each other, lenses of different thickness mounted within said openings, one lens flush with one plate and the other lens below the surface of the other plate to form a liquid chamber, an annular groove formed in one plate concentric with the opening therein, and radial ducts formed in the other plate communicating both with the annular groove and the liquid chamber when the plates are closed for conducting the excess liquid from the liquid chamber to the annular groove.

4. In a slide for holding liquids to be tested, the combination with a pair of flat plates hinged together and adapted to be closed one upon the other, each of said plates having an opening formed therein and in registry with each other when the plates are closed, lenses of different thickness mounted in said openings, one lens being flush with the surface of one plate and the other lens being below the surface of the other plate to form a chamber for the liquid, one of said plates formed with an annular groove in the surface thereof and concentric with the lens, the other plate formed with a series of radial ducts in its surface which when the plates are closed communicate both with the chamber for the liquid and the annular groove.

5. In a slide for holding liquids to be tested, the combination with a pair of flat plates hinged together and adapted to be closed one upon the other, each of said plates formed with an opening in registry with each other when the plates are closed, lenses mounted in said openings, one lens flush with the surface of one plate and the other lens below the surface of the other plate to form a liquid chamber, one of said plates formed with an annular groove concentric with the openings, an annular ring formed on the other plate concentric with the annular groove and formed with a series of radial ducts providing communication between the liquid chamber and the annular groove when the plates are closed.

6. In a slide for holding liquids to be tested, the combination with two plates adapted to be superimposed one above the other and each formed with an opening therein, of lenses mounted in said openings, one lens being on the same plane as one plate and the other lens being below the plane of the other plate to space said lenses apart when the plates are superimposed to form a liquid chamber, and means for receiving and removing the excess liquid from said liquid chamber comprising radial ducts formed in one plate and a well formed in the other of said plates.

7. In a slide for holding oil to be tested, the combination with two plates adapted to be superimposed one upon the other and both formed with registering openings therein, lenses mounted in said openings, one lens on a plane with the surface of one plate and the other lens below the surface plane of the other plate to form an oil chamber, and means for leading the excess oil from the oil chamber comprising radial ducts formed in one plate and an annular well formed in the other of said plates.

8. In a liquid testing device or slide, the combination with two plates adapted to be superimposed one above the other and each formed with an opening therein, lenses mounted in said openings one flush with the surface of one plate and the other below the surface of the other plate to space said lenses apart forming an oil chamber, and means for receiving and removing the excess oil from the oil chamber comprising radial ducts formed in one plate and an annular well formed in the other of said plates.

9. In a liquid testing container or slide, the combination with two plates adapted to be superimposed one upon the other and each formed with an opening therein, lenses of different thickness mounted in said openings, one lens on a plane with the surface of one plate and the other lens below the plane of the surface of the other plate placing said lenses a predetermined distance apart when the plates are closed to form a liquid chamber of a predetermined capacity, and an annular recess formed in one plate and communicating with said liquid chamber.

FRANK JAMES MAW.